United States Patent
Paul et al.

(10) Patent No.: US 12,470,956 B2
(45) Date of Patent: Nov. 11, 2025

(54) METHODS AND DEVICES FOR AUTOMATICALLY REESTABLISHING MEDIA ACCESS CONTROL SECURITY SESSIONS OVER WIDE AREA NETWORKS

(71) Applicant: Ruckus IP Holdings LLC, Claremont, NC (US)

(72) Inventors: Amit Paul, Bangalore (IN); Kiran Talluri, Bangalore (IN)

(73) Assignee: Ruckus IP Holdings LLC, Claremont, NC (US)

( * ) Notice: Subject to any disclaimer, the term of this patent is extended or adjusted under 35 U.S.C. 154(b) by 408 days.

(21) Appl. No.: 17/971,922

(22) Filed: Oct. 24, 2022

(65) Prior Publication Data

US 2023/0130016 A1    Apr. 27, 2023

(30) Foreign Application Priority Data

Oct. 25, 2021 (IN) .............................. 202121048514

(51) Int. Cl.
H04W 24/04 (2009.01)
H04L 12/46 (2006.01)
H04W 76/10 (2018.01)

(52) U.S. Cl.
CPC ......... *H04W 24/04* (2013.01); *H04L 12/4641* (2013.01); *H04W 76/10* (2018.02)

(58) Field of Classification Search
None
See application file for complete search history.

(56) References Cited

U.S. PATENT DOCUMENTS

| 9,602,440 | B2* | 3/2017 | Anpat ..................... H04L 12/28 |
| 11,032,106 | B1* | 6/2021 | Nautiyal ............. H04L 12/4633 |
| 11,115,230 | B2* | 9/2021 | Shribman ........... H04L 12/4633 |
| 2014/0064209 | A1* | 3/2014 | Anchan ................. H04W 76/25 |
| 2016/0308748 | A1* | 10/2016 | Zuo ....................... H04W 24/04 |
| 2017/0104851 | A1* | 4/2017 | Arangasamy ....... H04L 12/4633 |
| 2020/0220843 | A1* | 7/2020 | Hill ........................ H04L 63/162 |
| 2020/0389469 | A1* | 12/2020 | Litichever ............. H04L 63/145 |
| 2021/0385157 | A1* | 12/2021 | Agrawal ............. H04L 12/4641 |
| 2022/0053315 | A1* | 2/2022 | Wang ................... H04W 76/10 |

* cited by examiner

*Primary Examiner* — Gregory B Sefcheck
*Assistant Examiner* — Benjamin Peter Welte
(74) *Attorney, Agent, or Firm* — Myers Bigel, P.A.

(57) ABSTRACT

A first electronic device communicates over a wide area network by establishing a MACSec session with a second electronic device over the wide area network. The MACSec session is thereafter torn down in response to the first electronic device sensing a fault in the MACSec session. Then, one or more keep alive probes are transmitted to the second electronic device over the wide area network. A response to the keep alive probe is thereafter received. The MACSec session may then be automatically reestablished in response to receiving the probe.

18 Claims, 5 Drawing Sheets

METHODS AND DEVICES FOR AUTOMATICALLY REESTABLISHING MEDIA ACCESS CONTROL SECURITY SESSIONS OVER WIDE AREA NETWORKS

CROSS-REFERENCE TO RELATED APPLICATION

The present application claims the benefit of priority to Indian Provisional Patent Application No. 202121048514, filed on Oct. 25, 2021, in the Indian Patent Office, and the entire contents of the above-identified application are incorporated by reference as if set forth herein.

BACKGROUND

The present invention generally relates to network communications and, more particularly, to network communications over wide area networks.

Data centers have rapidly increased virtualization of servers, which dramatically increases both agility and flexibility. To take full advantage of server virtualization, the underlying communication networks may also be virtualized. Virtualization of a network and decoupling the virtual network from the underlying physical network makes it easier to manage, automate and operate the network.

Network virtualization refers to establishing mechanisms for segmenting and isolating data traffic within communication networks so that, for example, the different electronic devices that are connected to a network are restricted to only accessing data streams that are appropriate for each specific device. Various virtualized network techniques have been developed for segregating data streams. One widely used type of virtual network is the Virtual eXtensible Local Area Network ("VxLAN"). A VxLAN refers to a virtual network that uses a standardized encapsulation protocol to provide connectivity between two remote devices using tunnelling.

In particular, a VxLAN overlays a Layer 2 network connection on top of an underlying Layer 3 public network. A VxLAN may use any appropriate Internet Protocol ("IP") routing protocol. VxLANs use MAC Address-in-User Datagram Protocol (MAC-in-MP) encapsulation to establish the Layer 2 network connection or "subnet." Each Layer 2 subnet is identified by a VxLAN Network Identifier that is used to segment the network traffic. A first electronic device such as, for example, a first switch, receives at a first port data that is to be transmitted to a first port on a second electronic device (e.g.; a second switch). The first switch may receive the data from a third electronic device, and the data may be addressed to a fourth electronic device that is connected to the second switch. The first and second switches act as the respective endpoints to the VxLAN tunnel. The first switch and the second switch use standardized handshaking procedures to establish a VxLAN tunnel between the first and second switches. The first switch may encrypt the data that is to be transmitted and embed the encrypted data in one more packets that include an encapsulation header that consists of Layer 2+IP+UDP+VxLAN headers. The encapsulated packets are then transmitted through, for example, a second port of the first switch onto a public wide area network (e.g., onto the Internet) and are passed to the first port on the second switch. The second switch may validate the source port, the destination port, and the VxLAN Network identifier of the packets, and may then remove the VxLAN tunnel header and extract the inner payload.

Media Access Control Security ("MACSec") is an existing network security protocol that has been standardized as part of IEEE 802.1X-2010. The MACSec protocol operates at the Medium Access Control ("MAC") sublayer of Layer 2. The MACSec protocol may be used to provide confidentiality and integrity for data communications between two physical ports which are connected directly via the MAC sublayer. A secured MACSec session between two electronic devices will be torn down if the MAC layer connection between the two electronic devices is lost for some reason, such as, for example, a failure along a physical link or configuration changes at the transmitting or receiving devices. If the two electronic devices are connected by a direct physical link, physical layer modules in the first and second electronic devices may sense when the MAC layer connection has been reestablished. Once the MAC layer connection is reestablished, the two electronic devices automatically reinitiate the MACSec handshaking procedure to reestablish the MACSec session. However, if a MACSec session is established between two electronic devices over a wide area network using, for example, a VxLAN tunnel, there is no direct connectivity at the MAC layer between the two electronic devices. Thus, once a MACSec session is torn down due to a failure, there is no mechanism for reestablishing the MACSec session, even after the MAC layer connection has been reestablished.

SUMMARY

Pursuant to embodiments of the present invention, methods for a first electronic device to communicate over a wide area network are provided in which the first electronic device establishes a MACSec session with a second electronic device over the wide area network. The first electronic device tears down the MACSec session in response to sensing a fault in the MACSec session. The first electronic device may then transmit a keep alive probe to the second electronic device, and may receive a response to the keep alive probe. Thereafter, the first electronic device may automatically reestablish the MACSec session In some embodiments, the first electronic device may also complete a handshake with the second electronic device after receiving the response to the keep alive probe.

In some embodiments, the MACSec session may be formed over a VxLAN tunnel through the wide area network.

In some embodiments, sensing a fault in the MACSec session may comprise not receiving a packet over the MACSec session within a first predetermined time period.

In some embodiments, the first electronic device may be configured to transmit additional keep alive probes at a predetermined interval, where the predetermined interval is longer than the first predetermined time period. The predetermined interval may be configurable.

In some embodiments, the first electronic device may enable transmission of the keep alive probe in response to determining that a VxLAN cross-connect feature is not enabled.

In some embodiments, the first electronic device may receive a keep alive probe over the wide area network after tearing down the MACSec session. The received keep alive probe may be received from the second electronic device.

In some embodiments, the keep alive probe may comprise a MACSec HELLO packet.

In some embodiments, the first electronic device may disable transmission of the keep alive probe in response to determining that a MACSec physical interface is not operating.

In some embodiments, the first electronic device may be a switch.

In some embodiments, the MACSec session may be automatically reestablished at least in part in response to receiving the response to the keep alive probe.

Pursuant to further embodiments of the present invention, electronic devices are provided that include a networking subsystem that is configured to: establish a MACSec session with a second electronic device over a wide area network; tear down the MACSec session prior to conclusion of the MACSec session; transmit a keep alive probe to the second electronic device over the wide area network after tearing down the MACSec session; receive a response to the keep alive probe; and automatically reestablish the MACSec session. These electronic devices may comprise, for example, switches, and may perform the above-described methods.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Figure 1A:
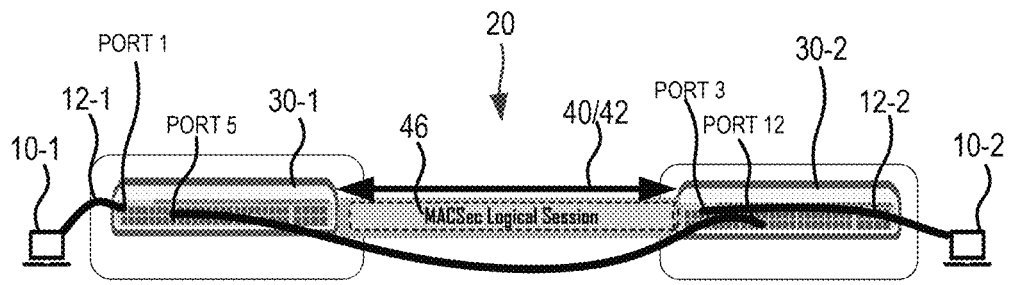
FIGS. 1A-1C are schematic diagrams illustrating communication between two electronic devices over a local area network using a MACSec logical session.

Various events may occur that can disrupt a MACSec session such as, for example, communication link failures (e.g., unplugged cables), malfunctioning electronic devices along the communication path, or network configuration changes that cause electronic devices along the communication path to cease supporting the MACSec session. If the MACSec session is formed between physically connected first and second electronic devices in a local area network, a physical layer module in each of the first and second electronic devices will sense loss of the MAC layer connection, and each physical layer module will notify a processor in its respective electronic device of the failure of the MAC layer connection. The processor in each electronic device will then tear down the MACSec session.

In many situations, a MAC layer connection that is lost for some reason may be reestablished very quickly. For example, a technician making configuration changes may inadvertently unplug the wrong cable, and then quickly plug the cable back in upon realizing the mistake. The physical layer modules in each electronic device will sense the reestablishment of the MAC layer connection, and notify the processors on the respective first and second electronic devices when this occurs. The processors on the first and second electronic devices will then automatically reestablish the MACSec session using the standard three-way handshake specified in the MACSec standard.

When a MACSec session is established over a wide area network (e.g., using a VxLAN tunnel), there is no direct connectivity at the MAC layer between the first and second electronic devices. The MACSec protocol provides that if a delay of more than two seconds occurs where no packets are received in a live MACSec session, the receiving electronic device will assume that the connection has been lost, and breaks down the MACSec session. In some cases, the MACSec session will be torn down (due to no packets having been received for at least two seconds) even though the MAC layer connection through the wide area network (e.g., a VxLAN tunnel) was not actually lost, or was temporarily lost but very quickly reestablished. For example, a live MACSec session may be torn down (terminated) simply because a series of packets were delayed due to network congestion while traversing a VxLAN tunnel or lost due to buffering limits at an intervening network device.

Unfortunately, when a MACSec session is established over a wide area network (e.g., using a VxLAN tunnel), there is no direct connectivity at the MAC layer between the first and second electronic devices. Consequently, if a MACSec session that is formed over a wide area network is prematurely torn down, the physical layer modules in the first and second electronic devices cannot sense reestablishment of the MAC layer connection over the VxLAN tunnel. As such, the two first and second electronic devices will not automatically reestablish the MACSec session. When this occurs, manual intervention by a network administrator is required to reestablish the secured MACSec session.

Pursuant to embodiments of the present invention, a keep alive feature is established that will act as a manual trigger to reestablish, without administrator intervention, a torn down MACSec secured session that is established over a wide area network using, for example, a VxLAN tunnel or other tunneling mechanism. In particular, after a first electronic device tears down a secured MACSec session that has been formed with a second electronic device in response to not having received a packet within two seconds, the first electronic device may generate keep alive probes that are transmitted to the second electronic device over the wide area network. Upon receiving a keep alive probe, the second electronic device may act so that the first and second electronic devices automatically reestablish the secured MACSec session.

In some embodiments, a first electronic device such as a switch may establish a MACSec session with a second electronic device (e.g., a second switch, a router or some other electronic device) over a wide area network. The MACSec session may be established over a tunnel through the wide area network such as, for example, a VxLAN tunnel. The MACSec session is thereafter torn down in response to the first electronic device sensing a fault in the MACSec session. For example, the first electronic device may not receive a packet over the MACSec session for a first predetermined time period, which may be perceived as a fault. In response to failing to receive packets associated with the MACSec session for a time period greater than the first predetermined time period, the first electronic device may generate one or more keep alive probes and then transmit these keep alive probes to the second electronic device over the wide area network (e.g., through the VxLAN tunnel). The keep alive probes may comprise, for example, MACSec HELLO packets. The first electronic device may be configured to transmit keep alive probes at a predetermined interval (e.g., keep alive probes will be transmitted at a periodic rate), and this predetermined interval may be longer than the first predetermined time period. If a response to the keep alive probe is received, then the first electronic device may complete a handshake procedure and automatically reestablish the MACSec session.

Embodiments of the present invention will now be described in further detail with reference to the figures.

Figure 1B:
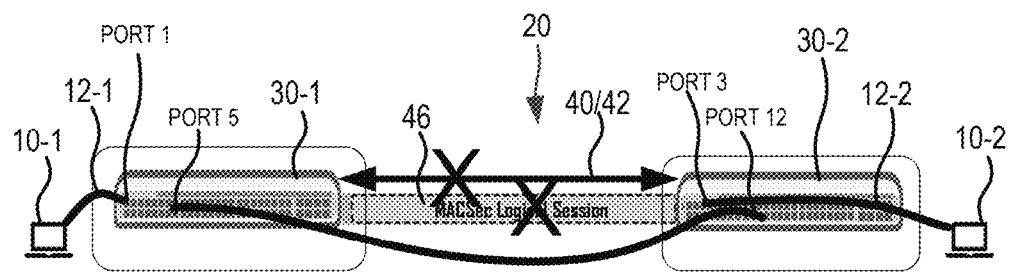
Figure 1C:
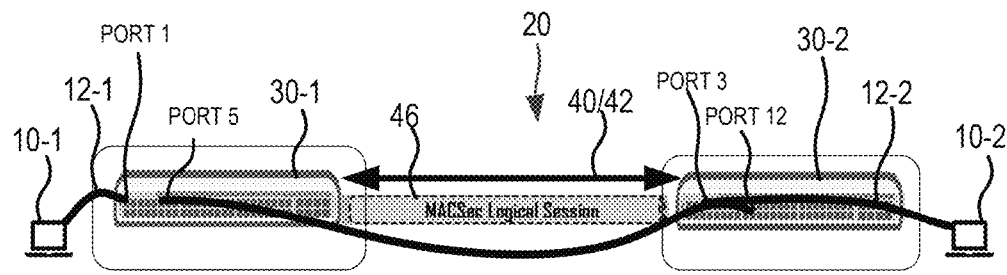

FIGS. 1A-1C are schematic diagrams illustrating communication between two client devices 10-1, 10-2 over a local area network 20 using a MACSec logical session. As shown in FIG. 1A, the first client device 10-1 needs to exchange data with the second client device 10-2. The first and second client devices 10-1, 10-2 may be any electronic devices such as servers, computers, printers, tablets, smart phones and the like. The first client device 10-1 is connected via a first connection 12-1 (which may comprise, for example, one or more cables and/or wireless connections) to a first port (here Port 1) of a first network switch 30-1 that is part of local area network 20, and the second client device 10-2 is connected via a second connection 12-2 (which may comprise, for example, one or more cables and/or wireless connections) to a first port (here Port 3) of a second network switch 30-2 that is also part of local area network 20. The first switch 30-1 is connected to the second switch 30-2 via a physical connection 40 which may comprise, for example, a cable 42 (e.g., an Ethernet cable or a fiber optic cable). In the example of FIGS. 1A-1C, the physical connection 40 extends between a second port (here Port 5) of first switch 30-1 and a second port (here Port 12) of second switch 30-2.

Upon receiving the data to be transmitted from the first client device 10-1 over the first connection 12-1, the first switch 30-1 invokes a MACSec handshake procedure to establish a MACSec session 46 with the second switch 30-2 over the physical connection 40. The first switch 30-1 may internally forward the data from Port 1 to Port 5 and transmit the data to the second switch 30-2 over the physical connection 40 and the MACSec session 46 is established on the physical connection 40. The second switch 30-2 receives this data at Port 12 and internally forwards the data to Port 3 where it is passed to the second client device 10-2 over connection 12-2.

The physical connection 40 connecting the first and second switches 30-1 and 30-2 may fail for a number of reasons. For example, configuration changes that occur at switch 30-1 or 30-2 may disrupt support of the MACSec protocol, one or both ends of the cable 42 may become unplugged, or a power outage may temporarily disrupt service. Referring to FIG. 1B, when such a fault occurs, the physical connection 40 will go down. A physical layer module (not shown) in each switch 30-1, 30-2 will notify a processor (not shown) in the respective switches 30-1, 30-2 that a fault has occurred such that the MAC layer connection has been lost. Upon receiving this notification, each switch 30 tears down the MACSec session. The large X's in FIG. 1B schematically illustrate the failure along the physical connection 40 and the termination of the MACSec session 46.

Thereafter, the fault may be resolved, and the MAC layer connection is reestablished. In response to reestablishment of the physical connection 40 (i.e., the reestablishment of a physical link between switches 30-1 and 30-2), the physical layer modules that are included in each switch 30-1, 30-2 notify the processor in the respective switches 30-1, 30-2 that the physical connection 40 has been reestablished. The switches 30 will then automatically initiate a MACSec session handshake procedure and reestablish the prematurely terminated MACSec session, as shown in FIG. 1C.

Figure 2A:
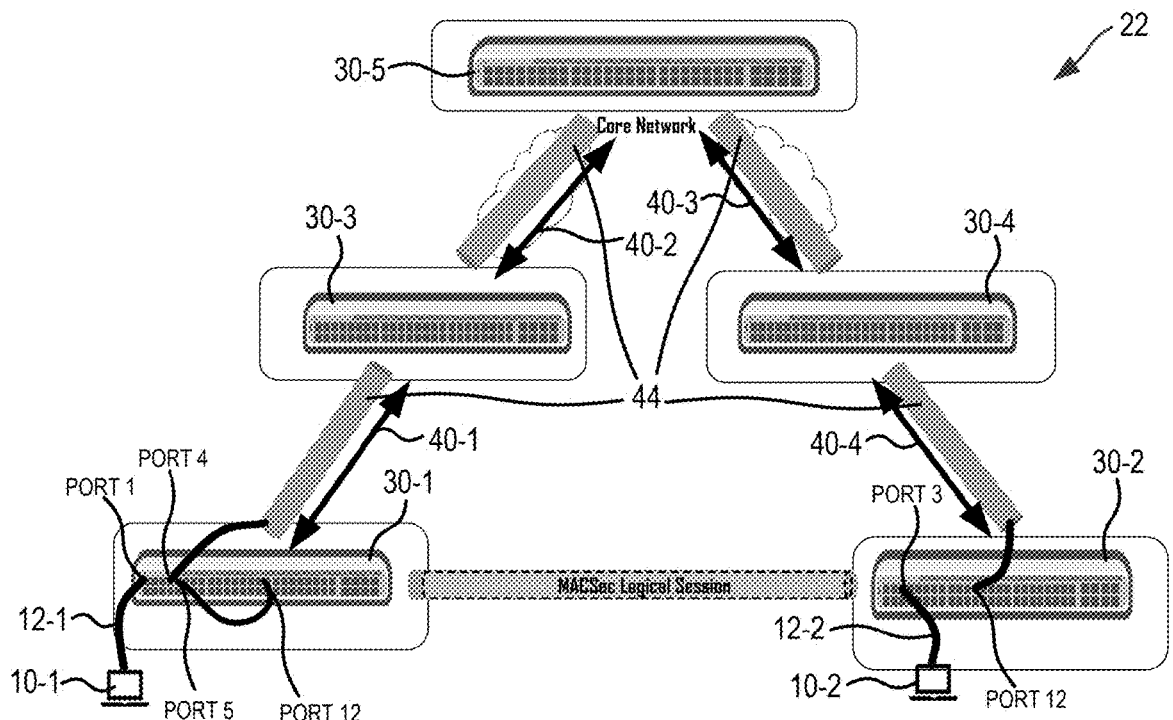
FIGS. 2A-2C are schematic diagrams illustrating communication between two electronic devices over a public wide area network using a MACSec logical session.
Figure 2B:
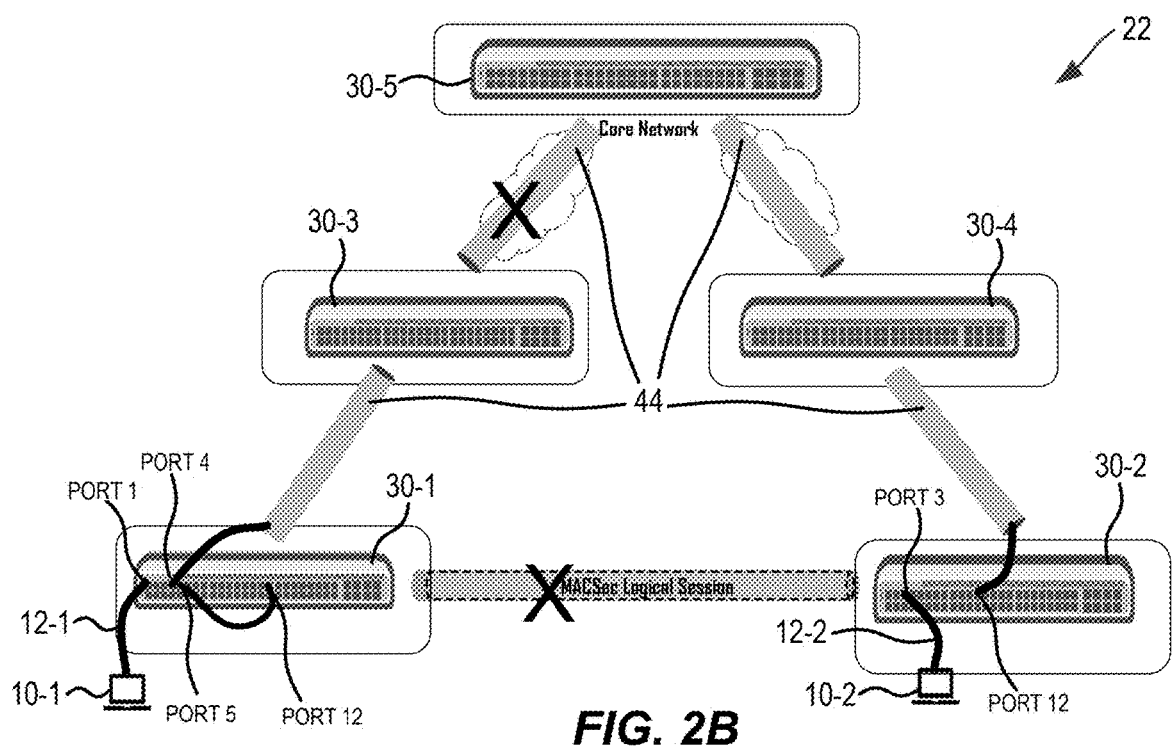
Figure 2C:
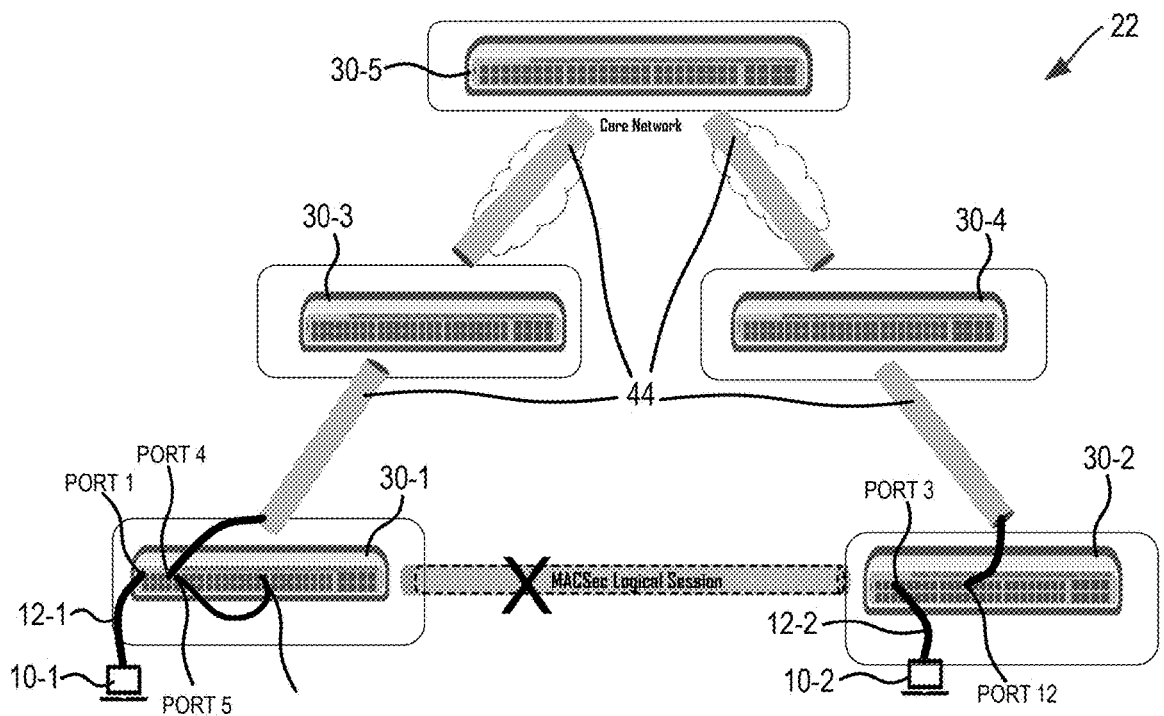

FIGS. 2A-2C are schematic diagrams illustrating operation of a MACSec session over a wide area network. For ease of explanation, elements from FIGS. 1A-1C that are also present in FIGS. 2A-2C are identified using like reference numerals, and description of operation of these elements will be reduced or omitted.

As shown in FIG. 2A, the first client device 10-1 is again connected to Port 1 of a first switch 30-1, and the second client device 10-2 is again connected to Port 3 of a second switch 30-2. Here, however, no direct physical connection is provided between the first and second switches 30-1, 30-2. Instead, each switch 30-1, 30-2 includes a port (Port 4 on first switch 30-1 and Port 12 on second switch 30-2) that is connected to a wide area network 22 such as the Internet. As is further shown in FIG. 2A, a secured VxLAN tunnel 44 may be established between Port 4 of first switch 30-1 and Port 12 of second switch 30-2 over the wide area network 22. In the example shown in FIGS. 2A-2C this secured VxLAN tunnel 44 extends through third through fifth switches 30-3 through 30-5 in the form of two distribution switches (30-3, 30-4) and a core switch 30-5. In other words, the secured VxLAN tunnel 44 may be established over a plurality of physical connections 40, including a first physical connection 40-1 between the first switch 30-1 and the third switch 30-3, a second physical connection 40-2 between the third switch 30-3 and the fifth switch 30-5, a third physical connection 40-3 between the fifth switch 30-5 and the fourth switch 30-4, and a fourth physical connection 40-4 between the fourth switch 30-4 and the second switch 30-2. It will be appreciated, however, that the secure VxLAN tunnel 44 may be established through either simpler or more complex physical routing paths. As is further shown in FIG. 2A, the first switch 30-1 may establish a logical MACSec session 46 with the second switch 30-2. The communications associated with the logical MACSec session 46 are transmitted between the first and second switches 30-1, 30-2 over the secure VxLAN tunnel 44.

Still referring to FIG. 2A, data that is to be transmitted over the secure VxLAN tunnel 44 (to the second client device 10-2) is received from the first client device 10-1 at Port 1 of first switch 30-1. The first switch 30-1 invokes a MACSec handshake procedure to establish a MACSec session with the second switch 30-2 over the secured VxLAN tunnel 44. In some implementations, the first switch 30-1 may forward the data received at Port 1 from client device 10-1 to another port (here Port 5) that is configured to perform MACSec processing. The MACSec processing that is performed at Port 5 of first switch 10-1 includes encrypting the data. The encrypted data is internally or externally forwarded to another port on first switch 30-1 (here Port 12). For example, a physical connection such as a cable may connect Ports 5 and 12 on switch 30-1 to allow forwarding the encrypted data to Port 12. Port 12 of first switch 30-1 is on the same VLAN as the port of first switch 30-1 (Port 4) that is connected to the wide area network 22. The encrypted data is encapsulated into a VxLAN packet and the encapsulated packet is then transmitted to the wide area network 22 through Port 4 of first switch 30-1. More specifically, the encrypted data encapsulated in the VxLAN packet is transmitted via the VxLAN tunnel 44 (and the MACSec session 46 established thereon) over the plurality of physical connections 40-1 to 40-4. The second switch 30-2 receives this data from the wide area network 22 at Port 12, extracts the encrypted data from the VxLAN packet, decrypts the data, and internally forwards the decrypted data to Port 3 where it is passed to the second client device 10-2.

As shown in FIG. 2B, a fault may occur in the VxLAN tunnel 44 or one or more of the physical connections 40, or some other failure may occur such that MACSec packets associated with the MAC Sec session between first switch 30-1 and second switch 30-2 are not received at second switch 30-2 for a period of at least two seconds. Here the fault is identified as occurring in the portion of the VxLAN tunnel 44 that connects distribution switch 30-3 tor core switch 30-5, but it will be appreciated that the fault may occur anywhere along the VxLAN tunnel 44. The fault may, for example, be a physical fault (e.g., an unplugged cable, a failed device port, a power outage, etc.), a software fault (e.g., a software configuration change) or may simply be the result of network congestion (e.g., packets associated with the MACSec session may be lost or delayed due to network congestion or other factors). When second switch 30-2 fails to receive a MACSec packet associated with the MACSec session for a period of at least two seconds, second switch 30-2 assumes that a failure has occurred and tears down the MACSec session. Once the MACSec session is torn down, the first switch 30-1 will likewise stop receiving packets (e.g., acknowledgments) and hence will also tear down the MACSec session within about two seconds. Thus, the fault in the VxLAN tunnel 44 results in termination of the MAC Sec logical session.

Referring to FIG. 2C, thereafter the fault in the VxLAN tunnel 44 may be resolved. For example, a physical fault may be remedied (e.g., a disconnected cable is reconnected) or congestion in the network that resulted in lost or delayed packets is resolved such that the secure VxLAN tunnel between the first and second switches 30-1, 30-2 is reestablished (if it even had been lost). However, because the first and second switches 30-1 and 30-2 are connected logically instead of physically, the physical layer modules in the first and second switches 30-1, 30-2 do not sense reestablishment of the secure VxLAN tunnel 44, and hence the MACSec logical session between the first and second switches 30-1, 30-2 is not reestablished.

Figure 3:
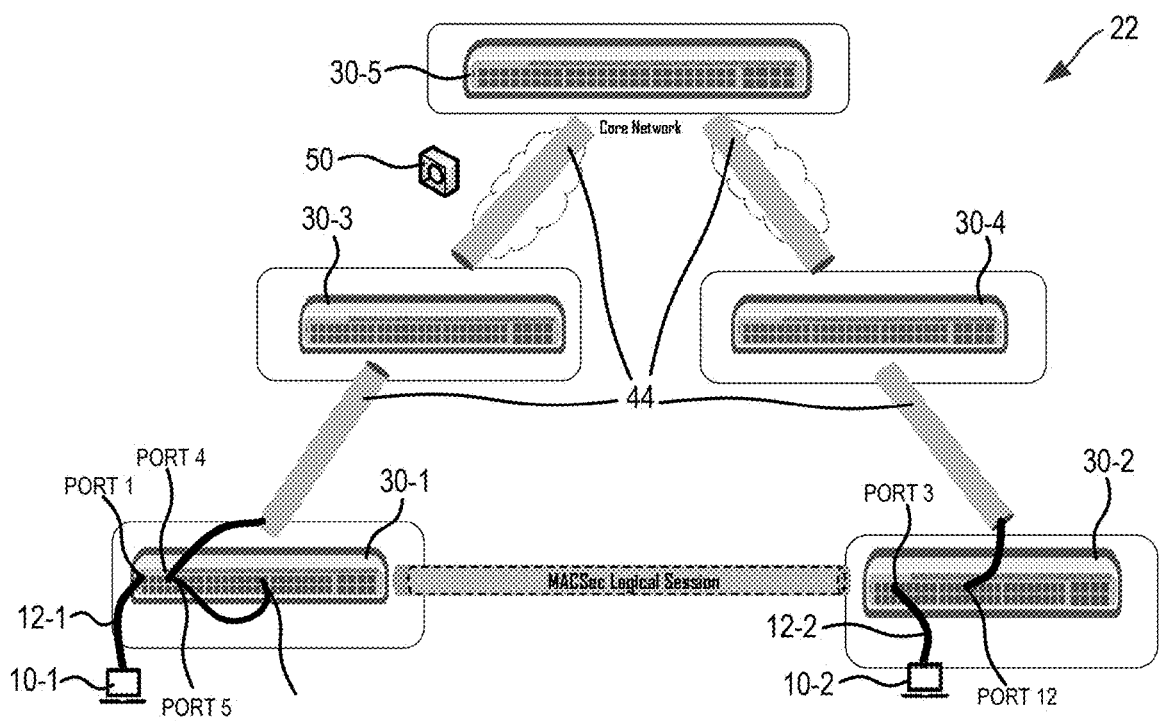
FIG. 3 is a schematic diagram illustrating reestablishment of a MACSec logical session between two electronic devices over a public wide area network pursuant to the communications techniques according to embodiments of the present invention.

As discussed above, pursuant to embodiments of the present invention, when a MACSec logical session that is established between first and second electronic devices (e.g., between the first and second switches 30-1, 30-2) over a wide area network 22 is prematurely terminated, one or both of the electronic devices 30-1, 30-2 may start to transmit keep alive probes 50 to the other electronic device 30-1, 30-2 over the wide area network 22 (e.g., over the VxLAN tunnel 44). This is illustrated in FIG. 3. The keep alive probes 50 may be transmitted, for example, every ninety seconds. If the failure that resulted in premature termination of the MACSec session is resolved (e.g., a physical failure is remedied or congestion or other issues are abated), then a keep alive probe 50 sent by, for example, the first switch 30-1 may be received at the second switch 30-2. In response to receiving a keep alive probe 50, the second switch 30-2 may send a response packet to first switch 30-1. Upon receiving the response packet, the first switch 30-1 may respond with another responsive packet, at which point both the first and second switches 30-1, 30-2 have confirmation that the VxLAN tunnel 44 over the wide area network 22 is properly operating. Each switch 30-1, 30-2 may then automatically reestablish the MACSec logical session.

It should be noted that while the probes 50 are referred to herein as "keep alive" probes 50, these probes are sent after the MACSec logical session 46 has been torn down, and the function of the keep alive probes 50 is to automatically reestablish the MACSec logical session 46. They are referred to as "keep alive" probes because they act to almost immediately restore the MACSec logical session 46, and from the viewpoint of the client devices 10-1, 10-2 it may even appear as if the MACSec logical session 46 was never lost.

Figure 4:
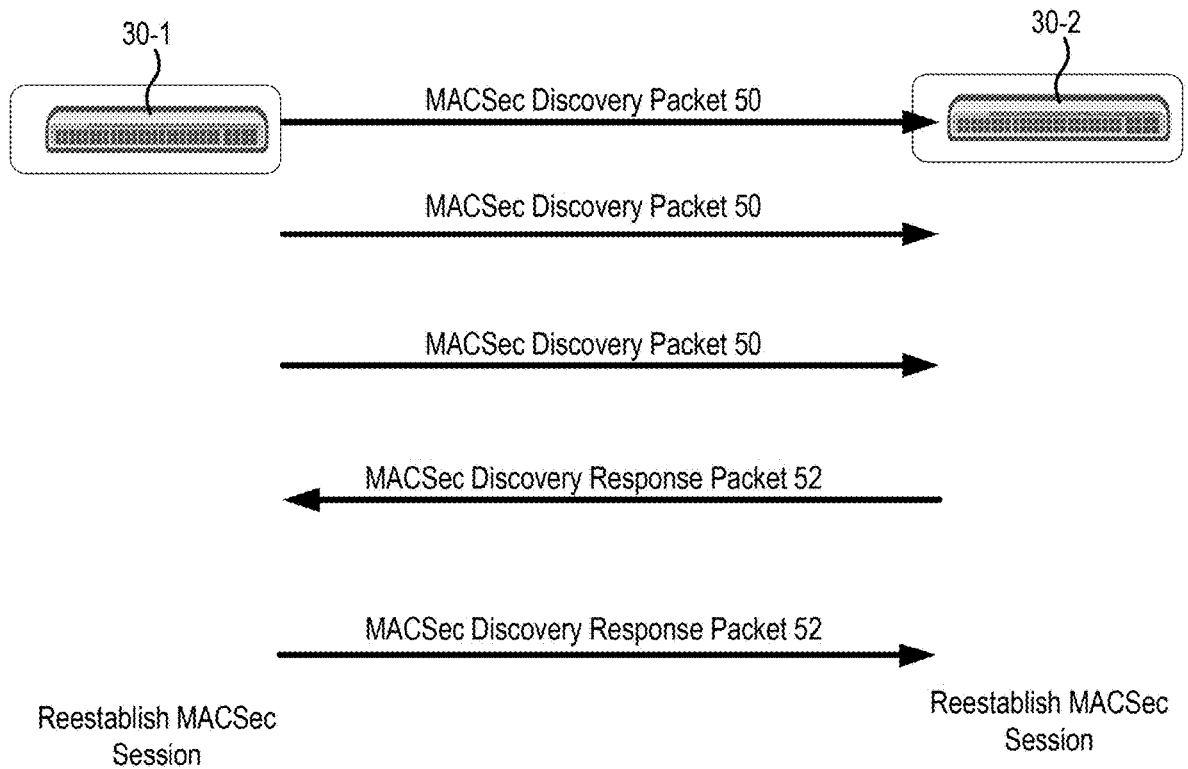
FIG. 4 is a schematic diagram illustrating how keep alive probes and responses may be used to reestablish a prematurely terminated MACSec session that was established over a wide area network.

In some embodiments, the keep alive probes 50 may be standard MACSec HELLO packets that are sent as the first packet of the three-way MACSec handshake. As shown in FIG. 4, after tearing down the MAC Sec session, the first switch 30-1 may send a series of such MACSec HELLO packets (as keep alive probes 50) over the wide area network to second switch 30-2. The MACSec HELLO packets keep alive probes may be sent at a predetermined interval (e.g., a keep alive probe may be sent every 90 seconds). The initial keep alive probes 50 may not be received at second switch 30-2 since the fault (e.g., a physical failure or congestion) in the VxLAN tunnel 44 may still be present. However, once the fault is resolved, then at least one of the keep alive probes 50 (here the third keep alive probe 50) is received at the second switch 30-2.

In response, to receiving such a HELLO packet 50, the second switch 30-2 may send a MACSec discovery response packet 52 to first switch 30-1. Upon receiving this response packet 52, first switch 30-1 may respond with another response packet 52 that completes the three-way handshake so that both the first and second switches 30-1, 30-2 understand that the other switch 30-1, 30-2 is up and operating and the physical link through the wide area network 22 that forms the VxLAN tunnel 44 is properly operating. Each switch 30-1, 30-2 may then automatically reestablish the MACSec logical session. Reestablishing the MACSec session may involve one or more additional handshakes that are used to establish authentication, encryption and the like.

It should be noted that both the first switch 30-1 and the second switch 30-2 may be configured to generate and transmit keep alive probes 50 in response to the premature termination of the MACSec session. Thus, the first switch 30-1 may receive one or more keep alive probes before and/or after the first switch transmits a first keep alive probe 50 after the premature termination of the MAC Sec session.

Transmission of the keep alive probes 50 places an additional load on the network. Thus, the rate (interval) at which keep alive probes are sent represents a tradeoff between network load and how quickly a prematurely terminated MACSec logical session may be established. As noted above, in example embodiments, keep alive probes 50 may be sent every 90 seconds after a MACSec session is torn down. In other embodiments, keep alive probes may be sent every 60 seconds. The keep alive probes may be sent until the MACSec session is reestablished. The period (interval) at which the keep alive probes are sent may be designed as a configurable parameter that may be set to optimize network performance.

VxLAN tunnels (as well as other tunnels) may be used to establish a virtual connection across a wide area network. VxLAN, however, may also be used in local area networks to provide connections over directly connected electronic devices or electronic devices that are connected through intermediate electronic devices in a non-public local area network. In these local area network scenarios, a cross-connect feature of the VxLAN is enabled that simplifies the connection since a tunnel across a public wide area network is not necessary. As described above, when two electronic devices are connected across a non-public local area network, physical layer modules in the endpoint electronic devices can sense reestablishment of a MAC layer connection and automatically reestablish a prematurely torn-down MACSec session. Thus, in this situation, keep alive probes are not necessary, and the endpoint electronic devices may suppress generation of any such keep alive probes.

As discussed above, the first and second switches 30-1, 30-2 have at least one port that is configured to act as a MACSec physical interface. This port may perform the MACSec handshaking, may encrypt the data to be transmitted (or decrypt received data), and may perform MACSec encapsulation and decapsulation, among other things. The first and second switches 30-1, 30-2 may be configured to sense whether or not their MACSec physical interface is operating properly ("up") or not ("down"). If the MACSec physical interface is down, the switches 30-1, 30-2 may again suppress generation of any such keep alive probes.

Figure 5:
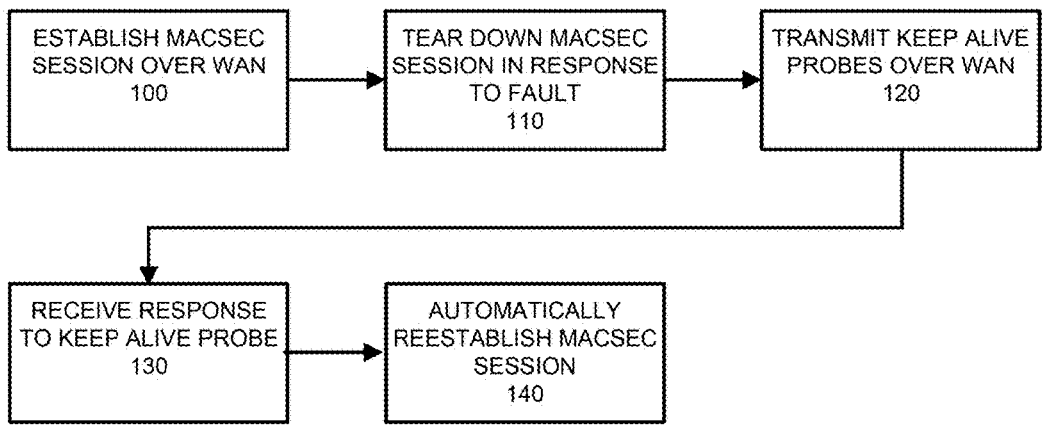
FIG. 5 is a flow chart illustrating a method for a first electronic device to communicate over a wide area network according to embodiments of the present invention

FIG. 5 is a flow chart illustrating a method for a first electronic device, such as a first switch, to communicate over a wide area network according to embodiments of the present invention. As shown in FIG. 5, operations may begin with the first electronic device communicating over a wide area network by establishing a MACSec session with a second electronic device over the wide area network (Block 100). The MACSec session may be established over a tunnel through the wide area network such as, for example, a VxLAN tunnel. The MACSec session is thereafter torn down in response to the first electronic device sensing a fault in the MACSec session (Block 110). For example, the first electronic device may not receive a packet over the MACSec session within a first predetermined time interval, which may be considered to indicate a fault situation. Then, one or more keep alive probes are transmitted from the first electronic device to the second electronic device over the wide area network (Block 120). The keep alive probes may comprise, for example, MACSec HELLO packets. The keep alive probes may be transmitted at a predetermined interval that is longer than the first predetermined time period. A response to the keep alive probe is thereafter received (Block 130). The MACSec session may then be automatically reestablished (Block 140).

It will be appreciated that the above described embodiments of the present invention are examples and that the scope of the present invention is not limited thereto. For example, in the above embodiments, the end points of the tunnel are ports on switches. It will be appreciated that in other embodiments, one or both of the end points may comprise other devices such as, for example, routers or any other device that that has MACSec enabled ports. As another example, the connections across the wide area networks in the examples described above are VxLAN tunnels.

Figure 6:
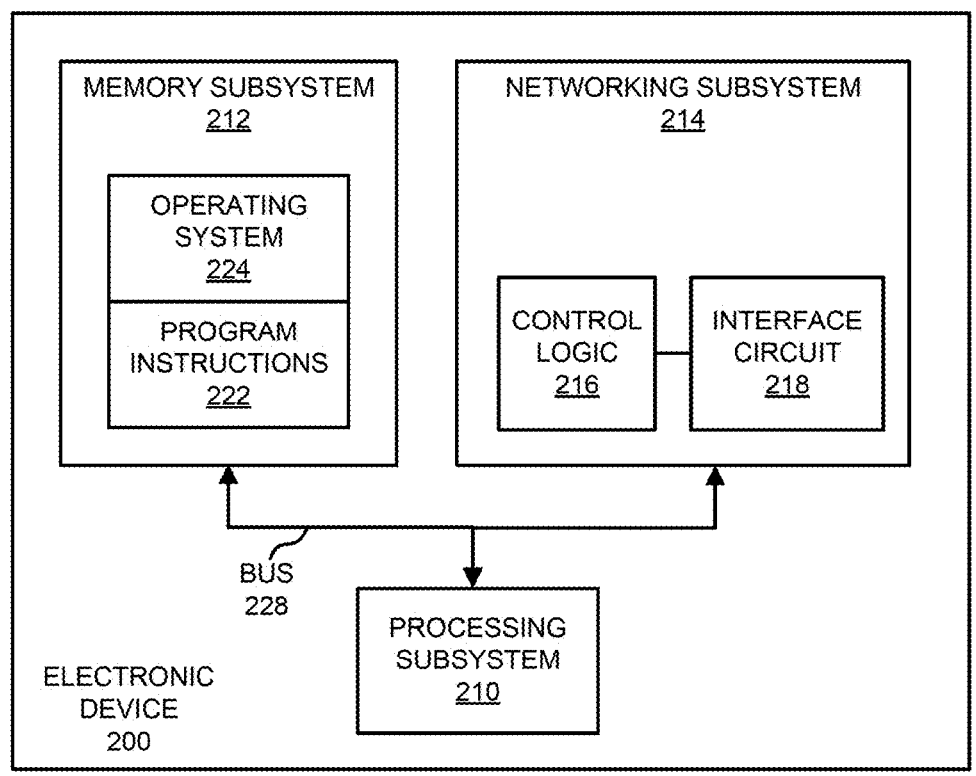
FIG. 6 is a block diagram of an electronic device according to embodiments of the present invention.

FIG. 6 is a block diagram illustrating an electronic device 200 in accordance with some embodiments. The electronic device 200 includes a processing subsystem 210, a memory subsystem 212, and a networking subsystem 214. Processing subsystem 210 includes one or more devices configured to perform computational operations. Memory subsystem 212 includes one or more devices for storing data and/or instructions. In some embodiments, the instructions may include an operating system and one or more program modules which may be executed by processing subsystem 210.

Networking subsystem 214 includes one or more devices configured to couple to and communicate on a wired (i.e., to perform network operations), including: control logic 216 and an interface circuit 218. Networking subsystem 214 includes processors, controllers, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Electronic device 200 may use the mechanisms in networking subsystem 214 for transmitting packets to other devices and for receiving packets from other devices.

Processing subsystem 210, memory subsystem 212, and networking subsystem 214 are coupled together using bus 228. Bus 228 may include an electrical, optical, and/or electro-optical connection that the subsystems can use to communicate commands and data among one another.

The operations performed in the communication techniques according to embodiments of the present invention may be implemented in hardware or software, and in a wide variety of configurations and architectures. For example, at least some of the operations in the communication techniques may be implemented using program instructions 222, operating system 224 (such as a driver for interface circuit 218) or in firmware in interface circuit 218. Alternatively or additionally, at least some of the operations in the communication techniques may be implemented in a physical layer, such as hardware in interface circuit 218.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A method for a first electronic device to communicate over a wide area network, the method comprising:
   establishing a MACSec session with a second electronic device over the wide area network;
   enabling transmission of a keep alive probe in response to determining that a VxLAN cross-connect feature is not enabled during the MACSec session;
   tearing down the MACSec session in response to sensing a fault in the MACSec session;
   transmitting the keep alive probe to the second electronic device over the wide area network after tearing down the MACSec session, if the transmission of the keep alive probe is enabled;
   receiving a response to the keep alive probe; and thereafter
   automatically reestablishing the MACSec session.

2. The method of claim 1, further comprising completing a handshake with the second electronic device after receiving the response to the keep alive probe.

3. The method of claim 1, wherein the MACSec session is formed over a VxLAN tunnel through the wide area network.

4. The method of claim 1, wherein sensing a fault in the MACSec session comprises not receiving a packet over the MACSec session within a first predetermined time period.

5. The method of claim 4, wherein the first electronic device is configured to transmit additional keep alive probes at a predetermined interval, where the predetermined interval is longer than the first predetermined time period.

6. The method of claim 5, wherein the predetermined interval is configurable.

7. The method of claim 1, further comprising receiving a keep alive probe over the wide area network after tearing down the MACSec session.

8. The method of claim 7, wherein the received keep alive probe is received from the second electronic device.

9. The method of claim 1, wherein the keep alive probe comprises a MACSec HELLO packet.

10. The method of claim 1, further comprising disabling transmission of the keep alive probe in response to determining that a MACSec physical interface is not operating.

11. The method of claim 1, wherein the first electronic device is a switch.

12. The method of claim 1, wherein the MACSec session is automatically reestablished at least in part in response to receiving the response to the keep alive probe.

13. An electronic device, comprising:
   a networking subsystem that is configured to:
      establish a MACSec session with a second electronic device over a wide area network;
      enable transmission of a keep alive probe in response to determining that a VxLAN cross-connect feature is not enabled during the MACSec session;
      tear down the MACSec session prior to conclusion of the MACSec session;
      transmit the keep alive probe to the second electronic device over the wide area network after tearing down the MACSec session, if the transmission of the keep alive probe is enabled;
      receive a response to the keep alive probe; and
      automatically reestablish the MACSec session.

14. The electronic device of claim 13, wherein the networking subsystem is further configured to complete a handshake with the second electronic device after receiving the response to the keep alive probe.

15. The electronic device of claim 13, wherein the networking subsystem is further configured to enable transmission of the keep alive probe in response to determining that a VxLAN cross-connect feature is not enabled.

16. The electronic device of claim 13, wherein the networking subsystem is configured to tear down the MACSec session prior to conclusion of the MACSec session in response to not receiving a packet over the MACSec session within a first predetermined time period.

17. The electronic device of claim 16, wherein the networking subsystem is further configured to transmit additional keep alive probes at a predetermined interval, where the predetermined interval is longer than the first predetermined time period, and wherein the predetermined interval is configurable.

18. The electronic device of claim 13, wherein the networking subsystem is configured to establish the MACSec session over a VxLAN tunnel through the wide area network.

* * * * *